ދ
3,516,784
Patented June 23, 1970

---

3,516,784
METHOD OF PREPARING SOLUBLE IRON POLY-
TUNGSTATE, AND PRODUCT THEREOF
Robert E. Dodds, Towanda, Pa., assignor to Sylvania
Electric Products Inc., a corporation of Delaware
No Drawing. Filed Sept. 19, 1967, Ser. No. 668,923
Int. Cl. C01g 41/00, 49/00
U.S. Cl. 23—51    15 Claims

ABSTRACT OF THE DISCLOSURE

A solid, stable, water-soluble, iron metatungstate, of the empirical formula $$[Fe(H_2O)_5(OH)]_3[H_2W_{12}O_{40}] \cdot xH_2O$$

is prepared by contacting an aqueous solution of a metatungstate salt of a cation having a greater exchange potential than $Fe^{+2}$ with a cation-exchange material on an $Fe^{+2}$ cycle. The effluent aqueous solution is preconcentrated by sparging with an inert gas and the solid iron metatungstate isolated from the solution by either freeze drying or evaporating under vacuum.

---

Essentially the method involves contacting an aqueous solution of a metatungstate salt of a cation having a greater exchange potential than $Fe^{+2}$ with a cation-exchange material (specifically resin) on an $Fe^{+2}$ cycle, as by passage through a bed of such a material. The metatungstate salt is preferably a metatungstate of an alkline-earth metal, and most preferably barium metatungstate. Details are given for placing the cation-exchange material on the $Fe^{+2}$ cycle, and for preparing the aqueous solution of metatungstate salt. The latter is passed through a bed of cation-exchange material at a pH of between 3 and 4 (when the salt is barium metatungstate) and at a temperature sufficiently high to prevent the precipitation of barium metatungstate on the bed.

Isolation techniques and results are described. Air-drying and steam-drying are ineffective in isolating the desired metatungstate product from aqueous solution. Preconcentrating the solution under indirect heat while sparging with a non-oxidizing gas, specifically nitrogen, followed by (a) vacuum drying or (b) freeze-drying are effective isolation means.

No theories are advanced or postulated as to how the product is formed. Example 2 shows that it cannot be obtained when using a cation-exchange resin that has been charged with $Fe^{+3}$ ion. In this case the effluent from the resin bed had a pH of 1.0 (rather than the 4.0 that would correspond to that of a metatungstate salt in solution); and the solution decomposed in 30 minutes, on standing, to give a yellow solid that was insoluble in water. X-ray diffraction patterns on this solid were very complex. A probability is expressed as to its composition.

The iron metatungstate of the invention is useful as a catalyst in chemical and polymeric reactions, and as an intermediate in making other compounds.

This invention relates broadly to a method of preparing an iron salt of a tungsten-bearing anion and, more particularly, an iron salt of a condensed polytungstic-acid, anion, and to a product of the method. Still more particularly the invention is concerned with a process for making reproducibly and efficiently, a water-soluble stable iron salt of metatungstic acid (iron metatungstate).

Mellor refers to a process for preparing ferrous metatungstate wherein iron is dissolved in metatungstic acid with subsequent isolation of impure crystals. (J. W. Mellor, A Comprehensive Treatise on Inorganic and Theoretical Chemistry, vol. XI, p. 827.) In this same reference ferric metatungstate was reported as being unattainable in crystalline form. Mellor (ibid., pp. 821–827) also reports a number of salts of metatungstic acid. A review of the literature shows that two different methods were generally used for making such salts, viz, acid-base neutralization and double decomposition.

The acid-base neutralization technique involves primarily the titration of metatungstic acid with an appropriate base until an endpoint or neutralization point is reached. The double-decomposition method involves a reaction between barium metatungstate and an appropriate salt when both compounds are solvated. The products formed are barium sulfate and a metatungstate salt.

Ion exchange, although not used for making metatungstate salts, has been used for salt splitting. In this process, a salt cation is exchanged for an ion of lower selectivity coefficient. The following series (reference: Amberlite Ion Exchange Resins Laboratory Guide, Technical Bulletin, March 1964, Rohm and Haas Company, Philadelphia, Pa.) tends to hold for most salts, and is an empirical representation of exchange potentials of the ions:

(a) $Na^+ < Ca^{++} < La^{+3} < Th^{+4}$
(b) $Li^+ < Na^+ < K^+ < Rb^+ < Cs^+$
(c) $Mg^{++} < Ca^{++} < Sr^{++} < Ba^{++}$

At high concentrations, high temperatures, or in non-aqueous media, the aforementioned series tends to break down, and the difference between the exchange potentials of the individual ions becomes very slight. An example of a salt-splitting reaction would be the passage of a solution of iron chloride over a bed of an ion-exchange resin on the sodium cycle. Sodium chloride would be obtained in the effluent, and the iron ions would remain on the resin.

The prior-art methods have serious disadvantages when applied to the synthesis of iron metatungstate. For example, the acid-base neutralization process requires that the iron be present as a basic salt cation. This is a hindrance to the use of the technique since ferric hydroxide is non-existent in such a procedure, and attempts to make this compound result in the recovery of a gelatinous precipitate of mixed oxides and hydrated oxides. Also, ferric carbonate reverts to an oxide and therefore cannot be employed. Hence, the acid-base process cannot be used for manufacturing iron metatungstate because of the lack of a suitable basic iron salt.

Double decomposition has been and can be employed for making iron metatungstate. Both ferrous and ferric ions form soluble sulfate salts, and both will react with barium metatungstate to give iron metatungstate. However, the solution of the product is unstable and results in decomposition after standing for a short period of time. A major drawback to the process is the fact that, as the barium ions react the concentration of barium in the solution decreases, thereby giving a broad range rather than a precise point when the reaction has been completed. This can be undesirable since it permits the possible presence of either unreacted barium ions or iron sulfate as an impurity in the desired product, viz, iron metatungstate. Hence process control of the reaction and reproducibility of the product are serious hindrances to the use of this technique unless there be employed an elaborate system for continuously checking the reaction solution for barium or sulfate.

The present invention is based on my discovery that the foregoing difficulties in the production of an iron salt of a condensed polytungstic-acid anion, specifically an iron salt of tungstic acid, can be obviated by a method which includes essentially the passage of a barium metatungstate solution over a cation-exchange material, more particularly a cation-exchange resin in the ferrous ($Fe^{+2}$) state.

As a result of this discovery there can now be made a soluble (specifically water-soluble), stable, reproducible iron metatungstate (iron polytungstate salt) having the aforementioned combination of properties heretofore unobtainable in iron metatungstate. Furthermore, there can be obtained a crystalline product in which the iron ions are symmetrically spaced within the crystal structure. Such results were wholly unobvious, particularly in view of the differing stabilities in solution and toward oxidizing agents of the two oxidation states of iron, viz., ferrous ($Fe^{+2}$) and ferric ($Fe^{+3}$), the latter being much more stable in these respects than the former. In practicing the present invention it is required that the ferrous ion be used as the source of iron in making the desired product, iron metatungstate.

GENERAL PROCEDURE

The following general procedure has been found to be satisfactory although modifications thereof will be apparent to those skilled in the art:

(1) Metatungstic acid is generated in any convenient manner from a water-soluble salt thereof, e.g., from an alkali-metal or an ammonium salt but preferably the latter. Typically, a solution of ammonium matatungstate, $(NH_4)_6 [H_2W_{12}O_{40}]$, is brought into intimate contact with a cation-exchange material previously placed on the hydrogen cycle, as by passage through a bed or column of such a material, which is preferably a resin. This solution should not contain more than about 3 parts by weight of ammonium metatungstate (calculated on a dihydrate basis) for each part by weight of water. Otherwise, the usual cation-exchange material will float in the solution and the free metatungstic acid will decompose to tungstic acid. (Parenthetically it may here be mentioned that in the experimental work herein described the weight percents were based on spray-dried ammonium metatungstate that contains from 4 to 6 moles $H_2O$ as water of hydration. However, because of the relative insignificance of the water with respect to the molecular weight of ammonium metatungstate, the percentages given are considered to be substantially correct for all practical purposes.)

(2) The effluent metatungstic acid solution is adjusted to a pH of between 3 and 4 by the addition of a suitable salt, more particularly a salt of a cation having an exchange potential greater than $Fe^{+2}$. Examples of such cations are the alkaline-earth metals; other examples will be found in the scientific literature. The preferred cation component of the salt is barium. Barium hydroxide can be used in making the barium metatungstate salt, or any other basic salt of barium. Barium carbonate is preferred because of its more rapid rate of reaction with metatungstic acid. Salts such as barium formate, barium acetate and the like may be employed, but the removal of the last hydrogen ions from metatungstic acid may not be achieved with such salts. In general, the anion of the basic salt must be that of a strong base such as hydroxide, carbonate, organic amino grouping or a quaternary ammonium grouping.

Taking barium metatungstate as illustrative of the metatungstate salt that is being prepared, and barium carbonate as illustrative of the barium compound used in its preparation, the above-described pH adjustment of the effluent metatungstic acid solution is effected while the solution is stirred and heated within the temperature range of from 25° C. to about 90° C. but preferably not higher than about 80° C., thereby to obtain a barium metatungstate solution.

Barium metatungstate is preferred for use in practicing the present invention because barium has one of the highest exchange potentials and, therefore, gives a more complete reaction with the ferrous ion on the cation-exchange material. The greater the difference in exchange potentials, the better and more extensive is the exchange reaction and the lower is the content of salt cation impurities (in this case, barium ions) in the effluent.

(3) The solution of the barium metatungstate is brought into intimate contact with a cation-exchange material, preferably a resin (previously placed on the $Fe^{+2}$ cycle), for instance by passing it through, advantageously downwardly through, a bed or column of such a resin. The solution is charged to the resin bed at a temperature of about 80°. The initial temperature of the charge and its flow rate through the column are such as to maintain a solution temperature during passage therethrough sufficiently high to prevent the precipitation of metatungstate salt on the cation-exchange resin. It is usually unnecessary to apply external heat to the column, and the temperature of the effluent is generally ambient or only moderately above ambient temperature.

Any ferrous salt of an organic or inorganic acid that is soluble in water can be used for charging the resin with ferrous ion. Examples of such salts are ferrous chloride, bromide, iodide, nitrate, sulfate, thiosulfate, thiocyanate, perchlorate and fluosilicate among the inorganic ferrous salts; and ferrous acetate and lactate among the organic ferrous salts. As the water-solubility of the ferrous salt decreases, the time required for charging the resin increases, and the charging efficiency decreases to uneconomical levels.

(4) The amber-colored effluent is an aqueous solution of iron metatungstate from which the solvent is removed by suitable means thereby to obtain a stable, water-soluble, substantially undecomposed iron metatungstate.

For example, the iron metatungstate can be isolated and recovered from solution by the process that is disclosed and claimed in the copending application of Vincent Chiola, Robert E. Dodds and Clarence D. Vanderpool, Ser. No. 668,950 now U.S. Pat. 3,440,732, filed concurrently herewith, assigned to the same assignee as the present invention, and which by this cross-reference is made a part of the disclosure of the instant application.

By the process described in the aforementioned Chiola et al. copending application complex inorganic compounds that are normally unstable during isolation from solutions (specifically aqueous solutions) thereof, because of their complex, heat-sensitive molecular structure when the solvent is evaporated from the solution by directly applied heat alone, are isolated in an improved purity and higher yield, together with other advantages, by a particular and unobvious combination of isolation techniques. This combination consists essentially in (1) preconcentration of the solution of the complex inorganic compound with indirect heat and while sparging it with a non-oxidizing gas, e.g., nitrogen, argon or helium, followed by (2) final concentration and removal of solvent by sublimation or lyophilization, i.e., freeze-drying.

From the foregoing description of the overall procedure employed in carrying this invention into effect, it will be seen that no nonreproducible endpoints exist as in the prior art double-decomposition process, and no basic salts are required as in the prior art acid-base process. It will also be noted that the invention incorporates the sharp endpoint obtainable in the acid-base neutralization process and an ion-exchange step whereby the nonspecific endpoint of the double-decomposition process is made highly reproducible.

Since the method of this invention for making an iron salt of a condensed polytungstic-acid anion (specifically iron metatungstate) has sharp, distinct endpoints, the product of the method is reproducible. Furthermore, the concentrations of the primary reactant solutions have no effect on the purity or upon the reproducibility of the final product. Since contamination of the product is kept to a minimal level, the quality of the product is very high.

THE CATION-EXCHANGE MATERIAL

Various, available cation-exchange materials can be employed in generating on the hydrogen cycle the free metatungstic acid and in converting on a ferrous cycle barium metatungstate (or other water-soluble metatungstate salt of a cation having a greater exchange potential than $Fe^{+2}$) to ferrous metatungstate. The cation-exchange substances that are used may be organic or inorganic, and of natural or synthetic origin. Among such materials may be mentioned gel zeolites, petroleum sludges, processed clays, the various phenol-aldehyde resins containing sulfonic groups, and the various sulfonated, moderately cross-linked sulfonated polymers, the primary component of which forms a thermoplastic polymer when polymerized alone. A particularly effective (and, therefore, preferred) material for use in the method of this invention is a sulfonated copolymer of styrene and divinylbenzene( cross-linking component) wherein the latter constitutes from about 6 to about 16 mole percent, and specifically about 8 mole percent, of the copolymer; and has a void volume of from 30 to 50%, specifically about 40%.

Typical properties of the aforementioned preferred copolymer, which is a commercially available product (Illco 211 of Illinois Water Treatment Company, Rockford, Ill.) are as follows:

Wet mesh size—16–50 mesh (U.S. Standard Sieve Series)
Maximum operating temperature—750° F.
Density—50–52 lbs./cu. ft.
Cross-linkage—8% from divinyl benzene monomer
Specific gravity—1.27
Moisture content—45–50%
Void volume—40%
Active group, —$SO_3H$
Maximum swelling—7%
Total exchange capacity—1.8 meq./ml. based on $H^+$ form; on same basis, 4.5 meq./dry g.

As indicated hereinbefore, and specifically shown in the illustrative examples that follow, the intimate contact of the cation-exchange material on the hydrogen cycle with a solution of the meta-tungstic salt (e.g., ammonium metatungstate) to be converted to the free metatungstic acid, or on the ferrous cycle with a solution of, for example, barium metatungstate, is preferably accomplished by passing the respective solutions through a bed or column of the aforesaid cation-exchange material. However, the intimate contact may also be accomplished by dispersing, as by agitation, the cation-exchange material in the individual solution. After agitating the mixture for sufficient time to allow the desired exchange to be effected, the cation-exchange material is separated from the solution by filtration, centrifuging or other suitable means. The resulting solutions are then further processed as has been described hereinbefore.

THE PRECONCENTRATION STEP

The removal of the solvent (specifically water) and the concentration of the solution containing an iron salt of a tungsten-bearing anion, more particularly iron metatungstate, are accomplished by sparging nitrogen and/or other non-oxidizing gas through a heated, agitated solution of the aforementioned salt. A sufficient volume of gas is sparged through the solution to insure complete purging of air and/or other oxygen-containing gas from the solution and to insure a non-oxidizing gaseous atmosphere in the vessel above the liquid surface of the solution. Mainly for reasons of economy and convenience, the preferred solvent is water; but other solvents of an organic nature may be used in lieu of all or parts of the water in the solution to be concentrated.

Satisfactory purging and evaporation of the solvent, usually at the ambient or prevailing atmospheric pressure, are accomplished at a temperature within the range of from about 65° C. to about 85° C., e.g., 70°–80° C. (when water is the solvent) with minimum risk of localized heating and decomposition. Other temperatures ranging, for example, from ambient temperature to 100° C. and higher may be employed depending, for instance, upon the particular solvent or solvent mixture that is used.

Indirect heating of the solution, as by the use of a covered vessel provided with agitating means and a jacket to which steam or other hot fluid is fed, is preferred over direct-heating means such as gas-firing, immersion heating, and the like. If desired or required, sufficient agitation, more particularly mechanical agitation, may be provided to prevent localized overheating and possible localized points of decomposition.

The percentage reduction in the volume of the solution that is effected in the preconcentration step before proceeding to the next processing step, viz., the recovery of the solid product, may vary considerably. Thus, volume reductions ranging from about 97% to about 10%, more particularly from about 97% to about 50%, based on the original volume may be required depending upon the volume of the solution to be handled. (These volume-reduction percentages may be expressed otherwise by stating that the volume of the concentrated solution that remains at the end of the preconcentration step may be from about 3% to about 90%, more particularly from about 3% to about 50%, of the original volume subjected to preconcentration.) Generally the volume of the solution that remains at the end of the preconcentration step is within the range of from about 15% to about 35%, specifically about 25%, of the original volume subjected to preconcentration.

Either batch or continuous feed methods of charging the sparging vessel can be employed. Continuous-feed technique is especially appropriate when large volumes of solution are to be handled, and it is desired to limit the size of the vessel in which the solution is to be preconcentrated.

THE FINAL ISOLATION STEP

As shown in Example 1 that follows, air-drying and steam-drying are ineffective means for isolating the desired iron metatungstate product from the aqueous effluent containing the same in solution. Preconcentrating the solution under indirect heat while sparging with a non-oxidizing gas, specifically nitrogen, as briefly described hereinbefore followed by (a) vacuum drying or (b) freeze-drying are effective isolation means. The preconcentration step, whereby a material reduction in the volume of the solution is effected by evaporation under heat while sparging with a non-oxidizing gas, makes the final recovery step, i.e., (a) and/or (b), supra, more practical. This is because the original effluent is quite dilute with respect to its content of desired iron metatungstate. By the isolation technique herein described, an isolation efficiency of 100% can be obtained since no detectable decomposition of product occurs. Loss is incurred only through handling of the effluent and preconcentrated solutions, or handling or dusting of the solid product.

VACUUM EVAPORATION

Vacuum evaporation of the preconcentrated solution to recover the product can be carried out at temperatures above 0° C. Thus, vacuum evaporation can be done at ambient temperature or under mild heat, e.g., at a temperature within the range of from 20° C. to about 35° C.; but temperatures down to almost the freezing point of water in the solution are not precluded. The vacuum applied to the system can be gradually increased, if desired, as evaporation proceeds. Typically, the maximum vacuum (lowest pressure) is less than 10 mm. Hg pressure, e.g., from 1–3 mm. Hg pressure. If mild heating is employed, this can be done, for example, by circulation of warm fluid through the jacket of a jacketed vessel containing the solution; or a temperature-controlled water bath, in which the glass or other vessel containing the solution is immersed, can be employed. The vessel and the solution are preferably agitated during vacuum evaporation. For this purpose a rotary vacuum-evaporation unit can be used if desired.

FREEZE-DRYING

Crystallization or low-temperature drying at reduced pressure (i.e., under vacuum) is accomplished by the use of standard or conventional laboratory or commercial freeze-drying equipment. In this step final concentration and removal of solvent are effected by sublimation or lyophilization.

In a typical freeze-drying crystallization step that can be employed in practicing the present invention, a concentrated solution of the iron metatungstate, as obtained from the above-described preconcentration step, is loaded into trays to a preferred level, e.g., about 0.5 inch. The solution is pre-frozen in any suitable manner, e.g., by placing the trays on Dry Ice, or in a freezer, or by chilling with liquid nitrogen, after which the trays containing the pre-frozen solution are loaded onto a pre-chilled shelf into a commercial freeze-dryer such as a Stokes Model 12P unit. It is preferred to have the concentrate pre-frozen in order to minimize processing time and the cost of freeze-drying. Relatively shallow loading of the trays is preferred for the same reason.

Lyophilic-vacuum crystallization proceeds for a period of, for example, about 15 hours. The freeze-drying cycle may vary, for instance, from 3 to about 24 hours or more depending upon the quantity of solvent to be sublimed.

The temperature of the material being freeze-dried is preferably maintained at below $-50°$ C. for approximately the entire time cycle. In some cases it may be advantageous to allow the temperature to increase slowly during the cycle in order to accelerate the sublimation of the water. Shelf heating may be effectively employed for heating. Temperatures ranging from below $-50°$ C. to about $25°$ C. (i.e., at or about ambient temperature) may be used in the freeze-drying cycle.

The applied vacuum initially is as low as is possible, but generally is of the order of 50 torr (i.e., 50 mm. Hg) when using commercial equipment. Reduced pressures down to 1–3 torr (obtainable with laboratory freeze-drying units) or up to 100 torr provided by commercial freeze-dryers can be employed.

In order that those skilled in the art may better understand how this invention can be carried into effect, the following examples are given by way of illustration and not by way of limitation. All parts and percentages are by weight unless otherwise stated.

EXAMPLE 1

A strong cation-exchange resin of the kind that is preferred for use in practicing this invention, more particularly the aforementioned Illco 211 resin, 16 to 50 mesh size, in the form of a 4" x 3' bed was used in this example. The resin was placed on the hydrogen cycle by passing five gallons of 6-molar HCl upwardly through the bed in about one hour's time. The bed was drained and washed for four hours with 10,000 ohm deionized water. Washing was conducted so as to expand the bed volume to twice its normal volume.

The washed and settled bed was placed on the iron cycle by passing four liters of an aqueous solution of 3-molar ferrous chloride solution vertically downwardly through the bed at a flow rate of about 8 liters per hour. The concentration of the ferrous chloride solution can be widely varied, e.g., as high as 10 molar or as low as 0.1 molar. No heat is required nor is any applied to either the resin bed or to the ferrous chloride solution while the bed is being charged with $Fe^{+2}$ ions. The flow rates are varied depending, for instance, upon the particle size of the resin, the percentage of cross-links therein, the volume of the bed, and other influencing factors.

The bed was washed with deionized water (about $15°$–$20°$ C. temperature) in order to remove excess ferrous ions, undesired anions, and the acid (HCl) that is formed when the bed is charged with ferrous chloride. Washing was continued until the effluent wash water was neutral (pH of 7), which required about 4 hours.

Barium metatungstate solution, which was subsequently passed through the above-described resin bed charged with ferrous ions, was prepared as follows:

An approximately 25 weight percent solution of ammonium metatungstate in water, at ambient temperature (about $25°$ C.), was passed vertically downwardly through a bed of Illco 211 cation-exchange resin on the hydrogen cycle. The strongly acid effluent (pH of less than 1) was collected, and a small unweighed amount of barium carbonate powder was added to stabilize the solution. Barium carbonate powder was added to this solution while it was being stirred, heated and pH monitored. The addition was continued until a pH of 3.7 was obtained. Depending upon the concentration of metatungstate salt in the solution, the pH will vary between 3 and 4. The hot ($80°$ C.) solution was vacuum filtered to remove the very slight amount of insoluble, white solid that was present. Upon cooling, a white, crystalline solid (barium metatungstate), soluble in water, was obtained.

Barius metatungstate, prepared as described in the preceding paragraph, was redissolved in deionized water by heating the solution to about $60°$ C. while stirring. The resulting solution, made to contain about 25 weight percent of barium metatungstate, was charged hot (about $80°$ C.) to and passed downwardly through the cation-exchange resin bed that had been placed on the ferrous cycle as previously has been described. No additional heat was needed during the passage of the solution through the bed of resin. The solution retained sufficient heat to keep the barium metatungstate in solution until it reacted. Once the barium had been exchanged for iron, the resulting product was soluble at room temperature. Hence no solids were precipitated on the resin particles, and no heat had to be applied to the resin column as, for example, by the use of a steam-jacketed column.

The effluent, amber in color and having a pH of 4, was divided in three parts which were either air-dried, steam-dried or vacuum-dried.

Air-drying gave a yield of about 30% when the solution was taken to dryness. Most of the resulting solid was insoluble in deionized water; and, when attempts were made to reisolate iron metatungstate, the solution continued to decompose. No soluble iron metatungstate could be isolated by air-drying. The soluble product that was recovered, when analyzed, did not conform with the empirical formulas for any of the following iron metatungstates:

(I)          $Fe_2[H_2W_{12}O_{40}] \cdot xH_2O$
(II)         $Fe_3[H_2W_{12}O_{40}] \cdot xH_2O$
(III)      $[Fe(H_2O)_5(OH)]_3[H_2W_{12}O_{40}] \cdot xH_2O$ Some degradation was denoted by the presence of a light yellow, insoluble solid.

Steam-drying gave no yield of soluble products when the solution was taken to dryness. When water was added, there was obtained a clear, water-white solution that gave only a slightly positive test for iron. With steam-drying, too, degradation was evidenced by the presence of a light yellow, insoluble solid.

The procedure involving vacuum drying was carried out as follows:

The effluent solution was transferred to a jacketed, glass vessel wherein it was concentrated (preconcentrated). A non-oxidizing gas, specifically nitrogen gas dried and heated to about $50°$ C., was passed through a gas-diffusion (i.e., sparging) unit immersed in the solution in the vessel. Nitrogen was charged to the sparging unit at a rate that induced mixing and turbulence in the solution. Low-pressure steam was passed through the jacket of the vessel. The temperature of the solution rose initially to $78°$ C. and slowly increased as the solution became more concentrated. At the end of the preconcentration period, the volume of the solution had been reduced to about one-fourth of the original volume, and the temperature of the concentrated solution was 94° C.

The very dark, almost black solution at 90° C. was placed in a 1000 ml., single-neck, round-bottom flask. It was connected to a rotary vacuum evaporation unit, and the flask was placed in a 30° C. water bath. Vacuum (corresponding to a pressure of less than 10 mm. Hg) was pulled on the system as the flask and the solution therein were rotated in the 30° C. bath. After vacuum evaporation for about 4 hours in this manner, a free-flowing rust-colored solid was obtained.

When a sample of the rust-colored solid was placed in deionized water, it redissolved to provide a clear, amber solution having a pH of 4 and which gave positive tests for both iron and tungsten. Upon standing for two weeks in a sealed, clear glass bottle, the rust-colored solid was still water-soluble, yielding a solution in which no insoluble decomposition products were observed.

Analysis of the solid recovered by vacuum-drying as above described showed good correlation (i.e., within the limits of analytical procedures) with Formula III, supra, i.e., $[Fe(H_2O)_5(OH)]_3[H_2W_{12}O_{40}] \cdot xH_2O$. Values of 66.0% W and 5.0% Fe were obtained, based on anlysis by atomic absorption for both elements, which is a molar ratio of W to Fe of almost exactly 4:1. This closeness to the theoretical is evidenced by the following data on the theoretical and actual percentages and ratios.

Theoretical:
    66.0% W
    Ratio—4:1
    5.01% Fe

Actual:
    66.0%
    Ratio—4.01:1
    5.0%

EXAMPLE 2

This example illustrates the results obtained when one employs a ferric ion, specifically ferric nitrate, in an attempt to produce a stable water-soluble iron metatungstate.

A 1″ by 18″ bed of a cation-exchange resin (100–200-mesh particle size, U.S. Standard Sieve Series), more particularly Dowex 12X resin (Dow Chemical Company, Midland, Mich.) was placed on the iron cycle using ferric nitrate and following the same procedure employed in Example 1 in placing Illco 211 cation-exchange resin on the iron cycle utilizing ferrous chloride as the source of iron. It is understood tht Dowex 12X resin is a copolymer of styrene cross-linked with about 12 weight percent divinylbenzene.

Two hundred and fifty (250) ml. of hot (about 60° C.) barium metatungstate solution that had been prepared as described in Example I was passed downwardly through the resin bed at its maximum flow rate of 25 ml. per minute. The effluent was light amber in color. This solution decomposed in 30 minutes, on sanding, to give a yellow solid that was insoluble in water. The pH of the effluent was 1.0 rather than the 4.0 that would correspond to that of a metatungstate salt in solution.

X-ray diffractions patterns on the solid were very complex due to the presence of mixed phases. The solid was probably a mixture of $WO_3$, $Fe_2(WO_4)_3$, $Fe_2O_3$ and other mixed oxides resulting from decomposition.

EXAMPLE 3

A 50 weight percent solution of ammoniummetatungstate in deionized water was passed over an Illco 211 cation-exchange resin that had been placed on the hydrogen cycle by the technique described in Example 1. (A maximum of 70 weight percent concentration of ammonium metatungstate in water can be used. If this value is exceeded very much the resin floats, tungstic acid is formed, and poor ion exchange is obtained.)

The effluent, an aqueous solution of metatungstic acid, has a pH of less than 2. The more concentrated that the effluent is in metatungstic acid, the lower is the pH. The aqueous metatungstic acid solution was collected and adjusted to a pH of 3.5 with barium carbonate as described under Example 1. The solution was initially at ambient temperature but was increased during neutralization until its temperature was between 70° and 80° C. at the time that the addition of barium carbonate was discontinued. The solution was heated and stirred during neutralization both to facilitate the removal of $CO_2$ by-product and also to keep in solution the barium metatungstate that is formed.

The solution, at about 70° C., was passed over a bed of Illco 211 cation-exchange resin that had been placed on the ferrous ion cycle following the same procedure described in Example 1 with the exception that ferrous sulfate was used in place of ferrous chloride for charging the resin with $Fe^{+2}$ ions.

The amber effluent was clear and had a pH of 4. It comprised an aqueous solution of iron metatungstate, which was isolated from solution by a combination of preconcentration while sparging with a non-oxidizing gas, specifically nitrogen, followed by vacuum-evaporation.

In isolating the product in this manner 2 liters of the iron metatungstate solution was placed in a glass-jacketed, glass kettle equipped with a cover and gas-sparging apparatus. The solution and kettle were first purged with nitrogen gas for 20 minutes at a rate sufficient to cause mild agitation of the solution. While continuing to sparge with notrogen gas, the solution was heated to 75°–80° C. by passing steam into the jacket of the kettle. Heating and sparging with nitrogen gas were continued for about 16 hours at about 75° C. until the volume of liquid in the kettle was reduced by evaporation of the aqueous solvent to about 500 ml., i.e., to about 25% of its original volume. The solution was cooled to approximately room (ambient) temperature by passing cold water through the jacket of the kettle while continuing nitrogen sparging. A clear, viscous, deep amber-colored, concentrated aqueous solution of iron metatungstate resulted.

The concentrated (preconcentrated) aqueous solution of the metatungstate salt was then transferred to a laboratory rotary dryer consisting of a single-neck, 1000 ml., round-bottom flask and provision for attachment to a vacuum system through a rotary seal. The concentrated solution was evaporated under vacuum during which period the pressure in the system was lowered to 1–10 torr. The temperature of the material being processed was held at 30° C. over a period of 4 hours while the pressure in the system was maintained at 1–10 torr.

At the end of the vacuum-evaporation step a rust-colored, water-soluble, stable, undecomposed solid was obtained. Analysis by atomic absorption for both elements gave 67.0% W and 5.0% Fe, which conform to the theoretical compound corresponding to the formula hereinbefore given for the product of Example 1 in the preparation of which ferrous chloride was employed. The following data on the theoretical and actual percentages and molar ratios of W to Fe are in agreement, within the limits of error of the analytical means employed, with the corresponding data with respect to the product of Example 1.

Theoretical:
    67.0% W
    Ratio of W:Fe=4:1
    5.09% Fe

Actual:
    67.0% W
    Ratio of W:Fe=4.07:1
    5.0% Fe

X-ray diffraction patterns on powdered iron-tungsten compound prepared and isolated as described under Examples 1 and 3 have three broad peaks that could be due to a cubic crystalline pattern. Electron spin-resonance shows the iron to be non-isotropic, not equally surrounded in the structure. Iron may exist in solution as $$[Fe(H_2O)_5(OH)]^{+2}$$

(reference: F. Albert Cotton and G. Wilkinson, Advanced Inorganic Chemistry, p. 715, Interscience Publishers, Division of John Wiley and Sons, New Work, N.Y.) at a range of pH that embraces the range of pH in which the metatungstate ion exists. The establishment of the formula $$[Fe(H_2O)_5(OH)]_3[H_2W_{12}O_{40}] \cdot xH_2O$$

is based on the foregoing analytical data and observations and known scientific facts related thereto.

Instead of isolating the iron metatungstate product by a combination of preconcentration while sparging with nitrogen or other non-oxidizing gas followed by vacuum evaporation as described specifically under Examples 1 and 3, and more broadly elsewhere herein, one can substitute freeze-drying for the vacuum-evaporation step. The freeze-drying technique has been described in some detail in a portion of this specification prior to the examples and more fully in the aforementioned Chiola et al. copending application, filed concurrently herewith.

The iron metatungstate of this invention is useful as a catalyst in chemical and polymeric reactions, and as an intermediate in making other compounds, e.g., other metatungstate salts by ion-exchange reactions.

What is claimed is:

1. A solid, stable, water-soluble iron metatungstate corresponding to the empirical formula $$[Fe(H_2O)_5(OH)]_3[H_2W_{12}O_{40}] \cdot xH_2O$$

2. The method of producing a solid, water-soluble, stable iron salt of metatungstic acid which comprises:
 (A) contacting a cation-exchange material on an $Fe^{+2}$ cycle with an aqueous solution of a water-soluble metatungstate salt of a cation having a greater exchange potential than $Fe^{+2}$ at a temperature sufficiently high to prevent the precipitation of the said metatungstate salt on the said cation-exchange material;
 (B) preconcentrating the resultant aqueous solution from step A by sparging with an inert gas to remove a portion of the water from said solution from step A to achieve a volume reduction of said solution of from about 10% to about 97%; and
 (C) recovering from the resultant concentrated solution from step B a solid, stable, water-soluble iron metatungstate by evaporation of said solution under vacuum.

3. The method as in claim 2 wherein the water-soluble metatungstate salt is a metatungstate salt of an alkaline-earth metal.

4. The method as in claim 3 wherein the alkaline-earth metatungstate salt is barium metatungstate.

5. The method as in claim 2 wherein the water-soluble metatungstate salt is barium metatungstate; the aqueous solution of barium metatungstate is passed over a bed of a cation-exchange resin on an $Fe^{+2}$ cycle at a temperature sufficiently high to prevent the precipitation of barium metatungstate on the said resin but not higher than about 80° C.

6. The method as in claim 5 wherein the water-soluble salt from which the ferrous ion is derived is ferrous chloride.

7. The method as in claim 5 wherein the water-soluble salt from which the ferrous ion is derived is ferrous sulfate.

8. The method as in claim 5 wherein the aqueous solution of barium metatungstate is one that has been formed by adjusting the pH of an aqueous solution of metatungstic acid to between 3 and 4 by the addition of barium carbonate.

9. The method of producing a solid, water-soluble, stable iron salt of metatungstic acid which comprises:
 (A) contacting a cation-exchange material on an $Fe^{+2}$ cycle with an aqueous solution of a water-soluble metatungstate salt of a cation having a greater exchange potential than $Fe^{+2}$ at a temperature sufficiently high to prevent the precipitation of the said metatungstate salt on the said cation-exchange material;
 (B) preconcentrating the resultant aqueous solution from step A by sparging with an inert gas to remove a portion of the water from said solution from step A to achieve a volume reduction of said solution of from about 10% to about 97%; and
 (C) recovering from the resultant concentrated solution from step B a solid, stable, water-soluble iron metatungstate by freeze drying.

10. The method as in claim 9 wherein the water-soluble metatungstate salt is a metatungstate salt of an alkaline-earth metal.

11. The method as in claim 9 wherein the alkaline-earth metatungstate salt is barium metatungstate.

12. The method as in claim 9 wherein the water-soluble metatungstate salt is barium metatungstate; the aqueous solution of barium metatungstate is passed over a bed of a cation-exchange resin on an $Fe^{+2}$ cycle at a temperature sufficiently high to prevent the precipitation of barium metatungstate on the said resin but not higher than about 80° C.

13. The method as in claim 12 wherein the water-soluble salt from which the ferrous ion is derived is ferrous chloride.

14. The method as in claim 12 wherein the water-soluble salt from which the ferrous ion is derived is ferrous sulfate.

15. The method as in claim 12 wherein the aqueous solution of barium metatungstate is one that has been formed by adjusting the pH of an aqueous solution of metatungstic acid to between 3 and 4 by the addition of barium carbonate.

References Cited

UNITED STATES PATENTS 3,425,794  2/1969  Chiola et al. _____ 23—23

OTHER REFERENCES

Mellor: "A Comprehensive Treatise on Inorganic and Theoretical Chemistry," vol. 11, Longmans, Green & Co., New York, 1931, p. 827.

HERBERT T. CARTER, Primary Examiner

U.S. Cl. X.R.

23—20, 22